M. J. JONES.
NUT LOCK.
APPLICATION FILED AUG. 12, 1914.

1,128,607.

Patented Feb. 16, 1915.

Witnesses
Robert M. Sutphen
A. I. Hind

Inventor
MORGAN J. JONES

By Watson E. Coleman
Attorney

UNITED STATES PATENT OFFICE.

MORGAN J. JONES, OF KINGMAN, ARIZONA.

NUT-LOCK.

1,128,607.     Specification of Letters Patent.     Patented Feb. 16, 1915.

Application filed August 12, 1914. Serial No. 856,407.

*To all whom it may concern:*

Be it known that I, MORGAN J. JONES, a citizen of the United States, residing at Kingman, in the county of Mohave and State of Arizona, have invented certain new and useful Improvements in Nut-Locks, of which the following is a specification, reference being had to the accompanying drawings.

This invention relates to nut locks and has for its primary object to provide means for positively and securely locking a nut upon a bolt to prevent the same from working off of the bolt by vibration of the parts.

It is a further object of the invention to produce a device of this character which may be employed in instances where the nut is to be applied to a bolt not easily accessible.

In its more specific aspect, the present invention contemplates the provision of a biting or locking pin loosely mounted in the nut and extending in parallel relation to the bore thereof, said pin being non-rotatable and provided with correspondingly beveled ends to produce biting points which project slightly beyond the faces of the nut, whereby upon the application of a jam nut to the bolt, the same will engage the outer point of the pin and force the other point thereof into the face of the object through which the bolt is disposed, said pin effectually preventing turning movement of the nuts upon the bolt or with relation to each other.

With the above and other objects in view, the invention consists in the novel construction, combination and arrangement of parts to be hereinafter more fully described, claimed, and illustrated in the accompanying drawing, wherein—

Figure 1:
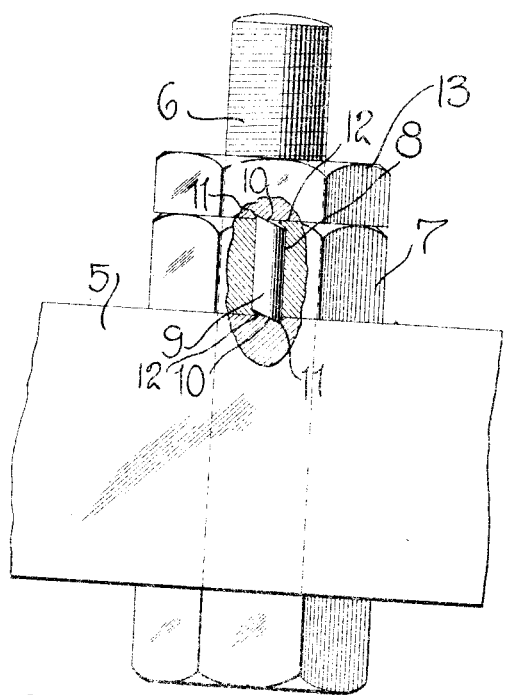
Figure 3:
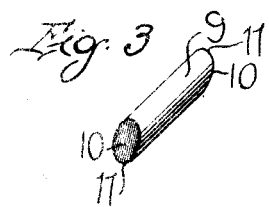
Figure 2:
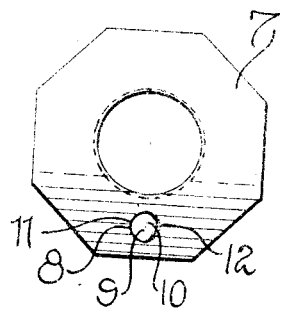

Figure 1 is a longitudinal section through the two nuts, showing my improved locking means therefor; Fig. 2 is a face view of the nut provided with the locking pin; and Fig. 3 is a detail perspective view of the pin removed from the nut.

Referring in detail to the drawing, 5 designates a casting or other object through which the bolt indicated at 6 is disposed.

7 designates a nut adapted to be threaded upon the bolt against the face of the casting 5. At one side of the bore of the nut 6 and in parallel relation thereto the same is provided with an opening 8 which extends entirely through the nut. The locking or biting pin 9 is loosely mounted in the opening 8 so that the same is free to move longitudinally therein to a limited extent. This pin is of slightly greater length than the thickness of the nut and its opposite ends are correspondingly beveled or inclined, as at 10, with relation to the axis of the pin. By beveling the ends of the pin in this manner, the cutting or biting points 11 are produced. The metal of the nut on each face thereof and upon relatively opposite sides of the opening 8, is swaged inwardly to form the stop projections 12 whereby the locking pin 9 is retained within the opening 8 and its longitudinal shifting movement limited.

When the nut 7 is threaded upon the bolt 6, one of the beveled ends 10 of the pin 9 faces in the direction of turning movement of the nut so that it will ride against the face of the casting 5 and move outwardly in the opening 8 as the nut is threaded into tight frictional engagement against the casting. A jam or lock nut 13 is then threaded upon the bolt 6 against the outer face of the nut 8, and as this latter nut is engaged with the outer beveled end of the pin 9, said pin is forced inwardly and, its inner biting point 11 embedded into the face of the metal casting 5. The outer point 11 of the pin 9 also cuts into the face of the lock nut 13. It is thus apparent that the nut 8 is held against reverse turning movement upon the bolt 6 and the lock nut 13 is also held against such turning movement with respect to the nut 8. In order to remove the nuts, a suitable wrench must be applied to the nut 8 and sufficient power applied thereto so that the inner end of the biting or locking pin 9 will cut out a chip or fragment of metal from the face of the casting 5, as the nut is turned. It is manifest therefore that the biting action of the pin 9 is sufficient to overcome any tendency of the nuts to work off of the bolt through strains or vibrations upon the machine or part to which the lock nut is applied.

As the single locking pin employed is entirely disposed within the body of the nut, the same is completely hidden from view and there are no projecting parts which would preclude the proper application of the nut to a bolt in places where the bolt is not easily accessible.

It is of course understood that the nuts and pins may be furnished in various sizes, and the improved lock employed upon nuts of the several forms now in common use.

I claim:

1. The combination of a nut provided with an opening therein, of a locking pin loosely mounted in said opening and having biting points at opposite ends projecting beyond the opposite faces of the nut, said nut being provided with means operating to limit the longitudinal movement of the pin and to prevent rotation thereof, and a jam nut also adapted to be threaded upon the bolt into engagement with the outer face of the nut and into biting engagement with one end of said pin, the other end of the pin being moved by the jam nut into biting engagement with the face of the member through which the bolt is disposed.

2. The combination of a nut provided with an opening in parallel relation to its bore, a locking pin loosely disposed in said opening and having correspondingly beveled end faces to produce biting points thereon adapted to project beyond the opposite faces of the nut, said nut being provided with inwardly projecting stops at opposite ends of the opening to retain the pin therein, and a jam nut adapted to be threaded against the face of the first nut into biting engagement with the outer end of said pin and to force said pin at its other end into biting engagement with the face of the object through which the bolt is disposed.

In testimony whereof I hereunto affix my signature in the presence of two witnesses.

MORGAN J. JONES.

Witnesses:
C. A. BRACKHURST.
H. E. KLEIN.